United States Patent
Kataoka et al.

(10) Patent No.: US 9,688,307 B2
(45) Date of Patent: Jun. 27, 2017

(54) ELECTRIC POWER STEERING CONTROLLER

(71) Applicant: DENSO CORPORATION, Kariya, Aichi-pref. (JP)

(72) Inventors: Motoaki Kataoka, Kariya (JP); Yosuke Hirate, Kariya (JP)

(73) Assignee: DENSO CORPORATION, Hariya, Aichi-pref. (JP)

( * ) Notice: Subject to any disclaimer, the term of this patent is extended or adjusted under 35 U.S.C. 154(b) by 0 days.

(21) Appl. No.: 14/874,810

(22) Filed: Oct. 5, 2015

(65) Prior Publication Data

US 2017/0096166 A1  Apr. 6, 2017

(51) Int. Cl.
 *B62D 15/02* (2006.01)
 *B62D 5/04* (2006.01)
 *B62D 6/00* (2006.01)
(52) U.S. Cl.
 CPC ......... *B62D 15/025* (2013.01); *B62D 5/0481* (2013.01); *B62D 6/002* (2013.01)
(58) Field of Classification Search
 CPC ..... B62D 15/025; B62D 5/0481; B62D 6/002
 USPC .......................................................... 701/42
 See application file for complete search history.

(56) References Cited

U.S. PATENT DOCUMENTS

| | | | | |
|---|---|---|---|---|
| 5,904,223 A | * | 5/1999 | Shimizu | B62D 5/0463 180/443 |
| 8,897,965 B2 | * | 11/2014 | Tamaizumi | B62D 5/0463 180/204 |
| 2008/0189014 A1 | * | 8/2008 | Tanaka | B62D 5/0466 701/42 |
| 2013/0060427 A1 | | 3/2013 | Kataoka et al. | |

FOREIGN PATENT DOCUMENTS

| | | |
|---|---|---|
| JP | 2004-203089 A | 7/2004 |
| JP | 2004-299492 A | 10/2004 |

\* cited by examiner

*Primary Examiner* — Brian P Sweeney
(74) *Attorney, Agent, or Firm* — Knobbe, Martens, Olson & Bear, LLP

(57) ABSTRACT

A steering controller for controlling an electric power steering includes a load estimator estimating a road surface load, a pre-correction target determiner determining a pre-correction target steer torque based on the estimated road surface load, a steer angle detector detecting a steer angle, and a target corrector correcting the pre-correction target steer torque based on the steer angle, and the controller determines an assist torque instruction value based on the deviation between the target steer torque and a steer torque, thereby establishing a robust steering feel of an electric power steering system irrespective of the change of the mechanical friction of the power steering system.

7 Claims, 9 Drawing Sheets

ELECTRIC POWER STEERING CONTROLLER

CROSS REFERENCE TO RELATED APPLICATION

The present application is based on a Japanese Patent Application No. 2014-078848, filed on Apr. 7, 2014, the disclosure of which is incorporated herein by reference.

TECHNICAL FIELD

The present disclosure generally relates to an electric power steering controller for controlling an electric power steering system, which assists a steering operation of a driver in a vehicle by using a motor.

BACKGROUND INFORMATION

An electric power steering controller disclosed in a patent document, Japanese Patent Laid-Open No. JP 2013-52793 A (patent document 1) estimates a load of a steering mechanism from a steer torque and from an assist torque instruction value, and sets a target steer torque based on the estimated load. Then, for the matching of the steer torque with the target steer torque, the controller calculates an assist torque instruction value based on a deviation of the steer torque from the target steer torque.

It is generally understood in the field of steering assist mechanism that, when a friction among the components in the steering mechanism or steering system components (which are a control object of the electric power steering controller) increases, a steering torque for steering a steering wheel also increases. Therefore, based on a technique used in the patent document 1, the assist torque instruction value must be increased with an increase of the friction between the components in the steering mechanism. Further, an increase of the assist torque instruction value that is used for the estimation of the load of the steering mechanism leads to an increase of the estimated load.

Under the influence of the friction, since the target steer torque in a turning state is increased, the steer torque increases to have a large value.

In a steering wheel return situation where the steering wheel is steered back to a neutral position, under the influence of the friction, steering torque decreases to zero before the steering wheel angle returns to the neutral position.

In other words, a returnability of the steering wheel (i.e., steering angle returning to 0 degree) becomes poor under the influence of the friction. That is, the driver has to apply additional force to the steering wheel to bring the steering wheel back to the neutral position.

The influence of the friction on the steering system components is particularly noticeable on a road with low coefficient of friction ($\mu$) (low $\mu$ road), since a road surface reaction force is small. In other words, the influence of friction on a low $\mu$ road is large compared with a high $\mu$ road.

In other words, when steering the steering wheel on a low $\mu$ road (e.g., in a turning state or a returning state), the increase of the steer torque is devastatingly large in comparison to a low friction time/case. This also means that the returnability of the steering wheel back to neutral position becomes poor (i.e., is worsened) during a high friction time in comparison to the low friction time.

Further, in a low-speed travel time of the vehicle, a self-aligning torque is small as compared with a high-speed travel time, which also leads to an increase of the friction influence in the steering system components in the low-speed travel time as compared with the high-speed travel time. Therefore, as compared with the high-speed travel time, the steer torque for steering the steering wheel increases in the low-speed travel time, and the returnability of the steering angle worsens.

In the conventional steering system, when the influence of the friction of the steering system components changes due to the change of the friction itself or due to the other factors such as the change of the road surface $\mu$ and/or the vehicle speed, a steering feel changes. That is, when the influence of the friction changes relative to the deviation of the friction itself or the deviation of the other factors, the steering feel of the steering wheel changes in the conventional system.

SUMMARY

It is an object of the present disclosure to provide an electric power steering controller that is free from the change of the mechanical friction of the electric power steering system, or an influence therefrom, which realizes, in other words, a robust/stable steering feel for a driver of the vehicle.

The above-mentioned object of the present disclosure is achieved by a combination of the features in an independent claim or claims, and dependent claims further specify the examples of other advantageous features of the disclosure.

Numbers and/or signs in the parentheses in the claims establishing relationships between the claimed elements and the concrete means in the embodiments should not be understood as limiting the claimed elements only to such embodiments nor as limiting the scope of the technical features of the present disclosure.

In an aspect of the present disclosure, an electric power steering controller is located in an electric power steering system that has a torque detector that detects a steering torque that is applied to a torsion bar based on a torsion angle of the torsion bar that serves as a part of a torque transmission path, for transmitting a rotation of a steering wheel in a vehicle to a tire to be steered, and a motor that generates an assist torque that assists a steering operation of the steering wheel when the steering wheel is operated for steering the tire. The electric power steering controller includes a load estimator that estimates a road surface load, a pre-correction target determiner that determines a pre-correction target steer torque based on the estimated road surface load, a steer angle detector that detects a steer angle representative of a rotation angle of a member that is rotated according to a rotation of the steering wheel, a target corrector that corrects the pre-correction target steer torque based on the steer angle detected by the steer angle detector and determines a target steer torque, and an instruction value determiner that determines an assist torque instruction value based on a deviation between the target steer torque and a steer torque.

According to the present disclosure, the assist torque instruction value is determined based on the deviation between the target steer torque and the steer torque. Further, the target steer torque is determined by correcting, based on the steer angle, the pre-correction target steer torque that has been determined based on the road surface load.

Since an influence of the friction generated in the steering system components (i.e., the friction influence affecting the steer torque) changes according to the steer angle, it is advantageously achieved, as shown in the present disclosure, that the pre-correction target steer torque determined based on the road surface load is corrected according to the steer angle, which reduces the friction influence from the steering system components. In other words, a robust steering feel is established against a change of the friction influence from the steering system components in various environments, based on the correction of the target steer toque according to the steer angle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
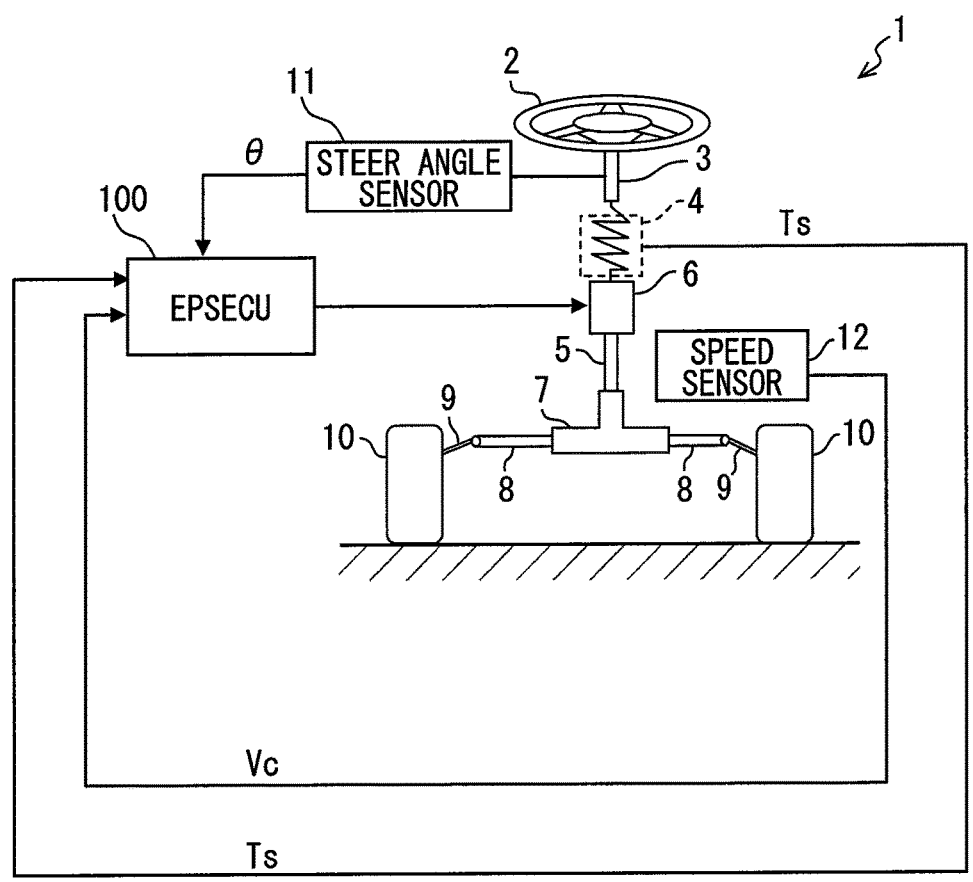
FIG. 1 is a block outline diagram of an electric power steering system in a first embodiment of the present disclosure.

The first embodiment of the present disclosure is described in the following with reference to the drawings. An electric power steering system 1 shown in FIG. 1 assists a driver's operation of a steering wheel 2 by using a motor 6.

The steering wheel 2 is attached to one end of a steering shaft 3 which is an input shaft. A torque sensor 4 is connected to the other end of the steering shaft 3, and an intermediate shaft 5 is connected to the other end of the torque sensor 4.

The torque sensor 4 is a sensor for detecting a steer torque Ts, and is equivalent to a torque detector. The torque sensor 4 includes a torsion bar which connects the steering shaft 3 and the intermediate shaft 5, and detects a torque currently applied to the torsion bar based on a torsion angle of the torsion bar.

The motor 6 assists an operation of the steering wheel 2 with a steering force. The motor 6 has a worm gear formed at a tip of a revolving shaft, and the worm gear engages with a worm wheel provided on the intermediate shaft 5. Thereby, a rotation of the motor 6 is transmitted to the intermediate shaft 5.

On the contrary, if the intermediate shaft 5 is rotated by a torque inputted from an operation of the steering wheel 2 or from the road surface, the rotation of the shaft 5 is transmitted to the motor 6 and the motor 6 is rotated.

The other end of the intermediate shaft 5 (i.e., an end that is opposite to the torque sensor 4 connected end) is connected to a steering gear box 7. The steering gear box 7 is a gear mechanism including a rack and a pinion gear (not illustrated), and gear teeth of the rack gear engages with the pinion gear provided on the other end of the intermediate shaft 5. Therefore, if the driver rotates the steering wheel 2, the intermediate shaft 5 rotates, and the rack moves to the right and to the left. A tie rod 8 is attached to both ends of the rack, respectively, and the tie rod 8 translates to the right and to the left together with the rack. Thereby, when the tie rod 8 pushes and pulls a knuckle arm 9 connected to the tie rod 8, a steered tire 10 is steered to the right and to the left.

A steer angle sensor 11, which detects a rotation angle of the steering shaft 3, is disposed on the steering shaft 3. The steer angle sensor 11 is equivalent to a steer angle detector.

Since the steering shaft 3 rotates together with the steering wheel 2, an angle detected by the steer angle sensor 11 is a steer angle $\theta$. The steer angle $\theta$ is, with reference to a neutral position (i.e., a steer angle of 0 degree at which the vehicle travels straight forward), measured as a positive value when steered to one of the right and the left, and as a negative value when steered the other way. A signal indicative of the steer angle $\theta$ is inputted to EPSECU 100.

A speed sensor 12 for detecting a vehicle speed Vc is provided at a predetermined position in the vehicle. A signal indicative of the vehicle speed Vc is also inputted to EPSECU 100.

According to such configuration, when the driver rotates the steering wheel 2, the rotation is transmitted to the steering gear box 7 via the steering shaft 3, the torque sensor 4, and the intermediate shaft 5. Then, when the rotation of the intermediate shaft 5 is turned into the right and left movement of the tie rod 8 and the tie rod 8 moves in the steering gear box 7, the steered tire 10 is steered to the right or to the left.

EPSECU 100, which may be an electric power steering controller, operates with an electric power from an in-vehicle battery (not illustrated).

EPSECU 100 calculates an assist torque instruction value Ta* based on the steer torque Ts detected by the torque sensor 4, the steer angle $\theta$ detected by the steer angle sensor 11, and the vehicle speed Vc detected by the speed sensor 12. Then, the assist torque from the motor 6 for assisting the driver to rotate the steering wheel 2 is controlled by controlling the motor 6 based on the assist torque instruction value Ta*.

Figure 2:
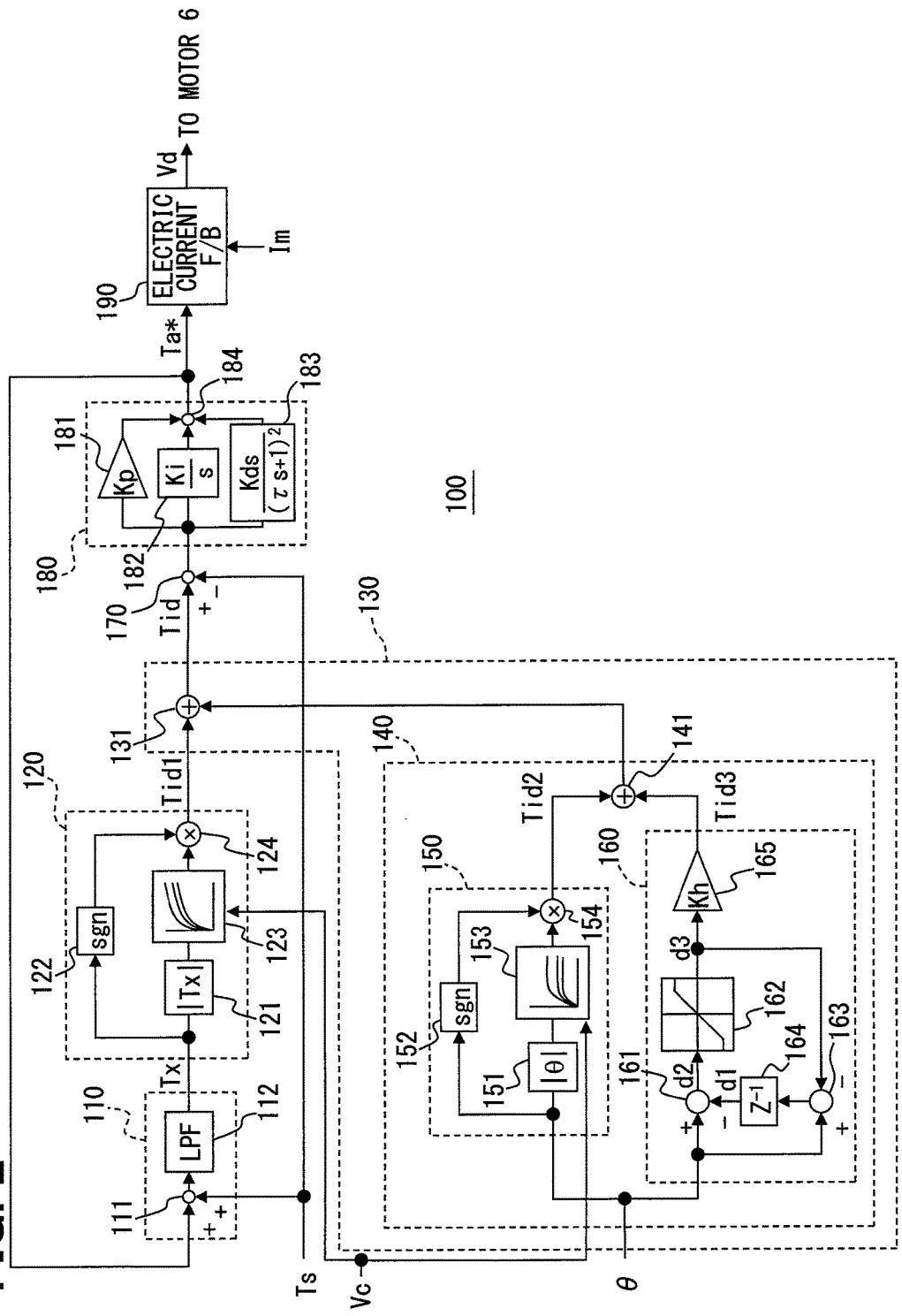
FIG. 2 is a block diagram of components in an Electronic Power Steering Electronic Control Unit (EPSECU) in the first embodiment of the present disclosure.

The components of EPSECU 100 are illustrated in FIG. 2. EPSECU 100 is provided with a load estimation part 110, a pre-correction target determination part 120, a target correction part 130, a subtraction part 170, a servo controller 180, and an electric current feedback part 190.

The load estimation part 110 includes an adder 111 and a low pass filter 112. The adder 111 adds the assist torque instruction value Ta* to the steer torque Ts. The added value is, after the removal of the high frequency noise by the low pass filter 112, is output to the pre-correction target determination part 120. The value outputted from the low pass filter 112 is an estimation value of a road surface load. Hereafter, the estimation value is designated as an estimated load Tx.

In the art of steering control, it is known that the driver operates the steering wheel in reliance on a reaction force from the steering wheel mainly in a frequency range of 10 Hz or lower. Therefore, the low pass filter 112 is in this case configured to pass a frequency component of 10 Hz or less, for example.

The pre-correction target determination part 120 is provided with an absolute value generation part 121, a sign generation part 122, a target torque generation part 123, and a multiplier 124.

The estimated load Tx, which is outputted from the load estimation part 110, is inputted to the absolute value generation part 121 and to the sign generation part 122.

The absolute value generation part 121 generates an absolute value of the estimated load Tx. The sign generation part 122 is provided with a sign function, which generates 1 when receiving a positive input value of the estimated load Tx or generates −1 when receiving a negative input value of the estimated load Tx.

The estimated load Tx converted into an absolute value by the absolute value generation part 121 is inputted to the target torque generation part 123. In addition, the vehicle speed Vc is also inputted to the target torque generation part 123.

Figure 3:
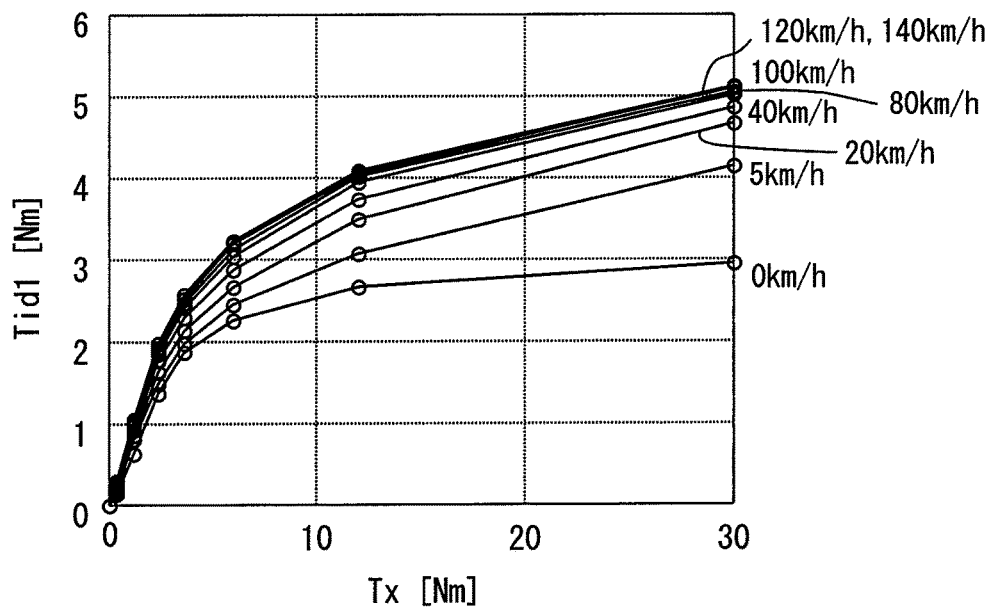
FIG. 3 is a graph of a target steer torque generation map used in a target torque generation part 123 of FIG. 2.

The target torque generation part 123 is provided with a target steer torque generation map illustrated in FIG. 3. The target steer torque generation map is a map which represents a relationship between the estimated load Tx and a pre-correction target steer torque Tid1 for every 20 km/h. In each relationship between the estimated load Tx and the pre-correction target steer torque Tid1 of every vehicle travel speed, the relationship is a logarithmic increase of the pre-correction target steer torque Tid1 as the estimated load Tx increases.

The target torque generation part 123 calculates an absolute value of the pre-correction target steer torque Tid1 by performing a linear interpolation of the map of FIG. 3 based on the vehicle speed Vc and the estimated load Tx.

The multiplier 124 performs a multiplication of (i) a value of 1 or −1 which is generated by the sign generation part 122 and (ii) the absolute value of the pre-correction target steer torque Tid1 which is calculated by the target torque generation part 123. The value after the multiplication is the pre-correction target steer torque Tid1.

According to the first embodiment, the pre-correction target steer torque Tid1 is not inputted to the subtraction part 170, but is inputted to the target correction part 130, in which the pre-correction target steer torque Tid1 is corrected, and is considered as a final target steer torque (i.e., a torque Tid).

The reason for performing the correction by the target correction part 130 is described.

Figure 4:
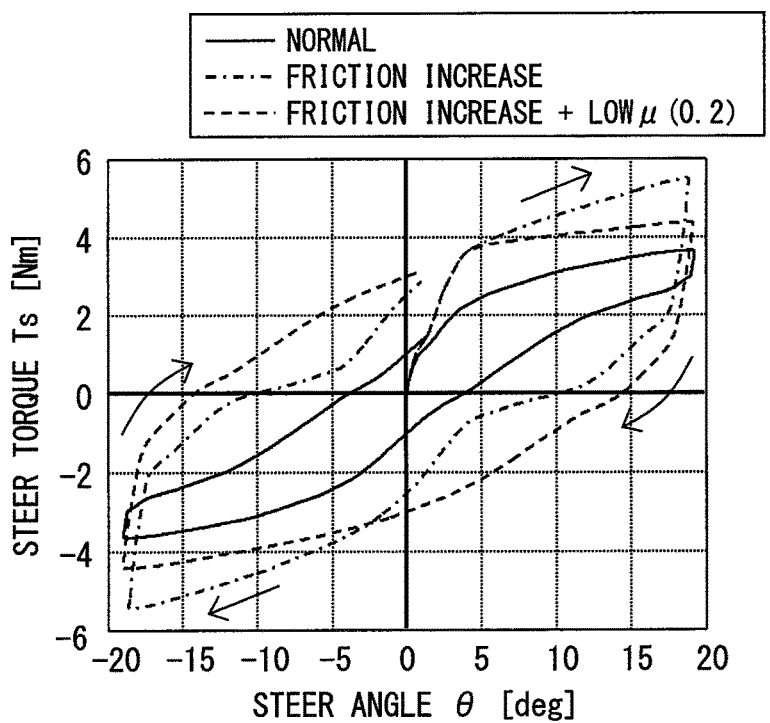
FIG. 4 is a graph of a relationship between a steer angle and a steering torque in a control by a pre-correction the target steer torque and a steer torque Ts.

FIG. 4 shows a graph of a relationship between the steer angle θ and the steer torque Ts when (i) the steer angle θ is changed along time to have a sine waveform and (ii) the pre-correction target steer torque Tid1 is directly (i.e., without correction) inputted to the subtraction part 170.

In FIG. 4, a graph with a solid line represents a normal time, a graph with a one-dot dash line represents a friction increased time when the friction of the steering system components is increased from the normal time, and a graph with a broken line represents a friction increased time on a low μ road (i.e., μ=0.2) (i.e., when the friction of the steering system components is increased from the normal time while the vehicle is traveling on the low μ road). The steering system components mean mechanical parts that constitute a torque transmission path from the steering shaft 3 to the steered tire 10.

The graph in FIG. 4 is basically in a point-symmetric shape around the origin, which simplifies an explanation of the graph only for a first quadrant (i.e., for a positive part of the steering angle θ).

In the first quadrant of the graph in FIG. 4, as clearly seen from a comparison between the normal time and the friction increased time, the steer torque Ts is increased in a steered time (i.e., when the steering wheel is steered from the neutral position to the left angle to about 20 degrees, as the friction increases).

Further, when returning the steering wheel to the neutral position (i.e., when the steer angle θ decreases to a small value), the steer torque Ts falls down to zero at the steer angle θ of about 4 degrees in the normal time. The same thing happens in the friction increased time at much earlier timing (i.e., at the steer angle θ of about 10 degrees). Further, the waveform of the friction increased time is swelled further down in the fourth quadrant than the waveform of the normal time. That is, in conclusion, the returnability of the steering wheel worsens when the friction increases. In other words, to return the steering wheel back to the neutral position, the driver actually has to apply a force to the steering wheel, which is similar to a turning operation (i.e., an operation for forcing the steering wheel away from the neutral position), instead of simply performing a steer-back operation (i.e., an operation returning the steering wheel back to the neutral position), at such time the steering wheel rotates and returns to the neutral position relatively freely according to a restoration force of the steering wheel itself.

The waveform in the broken line, which is a situation when the friction increases and the vehicle is traveling on a low μ road, further swells down to a lower part in the fourth quadrant than the waveform of the friction increased time in the one-dot dash line. This is because of a lowering of a slip limit of a lateral force on the tire, which means that a restoration force from a tire side is lowering. In other words, the lowered restoration force results in (i) a lower-than-normal steer torque, which happens for a part of the graph in the first quadrant (i.e., the steer torque is lower than the intended one in a steer-back operation), and (ii) a need for forcing the steering wheel back to the neutral position, which is similar to the steer-away operation of forcing the steering wheel, rather than the relatively-free steer-back operation.

As shown in the FIG. 4, change of the steering feel is caused due to the change of steer torque Ts when the friction increases or when the road surface μ decreases. Further, although not shown in FIG. 4, the self-aligning torque at the same steering angle is smaller at the low-speed travel time compared with the high-speed travel time, which means that an influence of the friction increase is greater at the low-speed travel time, changing the relationship between the steer angle θ and the steer torque Ts.

However, it is not preferred by the driver to have a deviation of the steering feel (i.e., change of the steering feel due to the increase of the friction of the steering system components, the road surface reaction force, and/or the vehicle speed Vc). Therefore, the pre-correction target steer torque Tid1 is not inputted to the subtraction part 170 as it is, but the target correction part 130 performs the correction.

The target correction part 130 is provided with an adder 131 and the target correction torque generation part 140. Further, the target correction torque generation part 140 is provided with an adder 141 which is equivalent to an adder in the claims, a steer angle based target correction part 150, and a hysteresis correction part 160.

The steer angle based target correction part 150 is provided with an absolute value generation part 151, a sign generation part 152, a target torque correction part 153, and a multiplier 154.

The steer angle θ which is detected by the steer angle sensor 11 is inputted to the absolute value generation part 151, and an absolute value of the steer angle θ is generated. The steer angle θ which is detected by the steer angle sensor 11 is inputted also to the sign generation part 152. The sign generation part 152 is provided with a sign function, which generates 1 when receiving a positive input value of the steer angle θ, or generates −1 when receiving a negative input value of the steer angle θ.

The target torque correction part 153 is provided with a correction torque generation map. The correction torque generation map is a map of a relationship between the steer angle θ and a steer angle reference correction torque Tid2. Although the correction torque generation map differs from the target steer torque generation map of FIG. 3 in terms of the input value, the relationship of the output value and the input value is the same. That is, the correction torque generation map is a map which outputs a greater steer angle reference correction torque Tid2 as the steer angle θ increases. Further, a relationship between the steer angle reference correction torque Tid2 and the steer angle θ is defined for every travel speed Vc, which results in the same trend as the target steer torque generation map, outputting a greater steer angle reference correction torque Tid2 as the vehicle speeds Vc increases to a high value.

The target torque correction part 153 calculates an absolute value of the steer angle reference correction torque Tid2 by performing a linear interpolation of the correction torque generation map based on the vehicle speed Vc and the steer angle θ.

The multiplier 154 performs a multiplication of the value of 1 or −1 which is generated by the sign generation part 152 and the absolute value of the steer angle reference correction torque Tid2 which is determined by the target torque correction part 153. The value after the multiplication is the steer angle reference correction torque Tid2.

The hysteresis correction part 160 is provided with a subtracter 161, a restrictor 162, a subtracter 163, a previous value retainer 164, and an amplifier 165.

The subtracter 161 subtracts a difference value of the steer angle θ from a current value of the steer angle θ, i.e., subtracts (i) a value in the previous value retainer 164, which is a difference between a previous value of the steer angle θ (i.e., θ(n−1)) and a previous value of d3 (i.e., d3 (n−1)) from (ii) a current value of the steer angle θ (i.e., θ(n)). The result of the subtraction is a value d2. The value d2 is inputted to the restrictor 162.

The restrictor 162 has an upper limit value and a lower limit value that has an inverted sign of the upper limit value together with the same absolute value thereof. The restrictor 162 outputs the same value as an input value when the value d2 inputted from the subtracter 161 is a value between the upper limit and the lower limit. When the input value d2 of the restrictor 162 is equal to or greater than the upper limit, the restrictor 162 outputs the upper limit value as the value d3. Further, when the input value d2 of the restrictor 162 is equal to or below the lower limit, the restrictor 162 outputs the lower limit as the value d3.

The subtracter 163 subtracts the value d3 that is output from the restrictor 162 from the current value of the steer angle θ (i.e., from θ(n)).

The previous value retainer 164 holds a value which is output from the subtracter 163 as a result of the subtraction. The value currently held in the retainer 164 is designated as a value d1.

The value d1 which is held by the previous value retainer 164 is outputted to the subtracter 161, when the steer angle θ is inputted to the subtracter 161 next time.

If the steer angle θ of the next time is considered as a base, the value d1 which is held by the previous value retainer 164 is a value calculated by the steer angle θ(n−1) of the previous time.

The amplifier 165 amplifies the value d3, which is outputted from the restrictor 162 with a gain Kh that is set in advance. The value after the amplification is a hysteresis correction torque Tid3. Thus, the hysteresis correction torque Tid3 determined in this manner changes to be finally staying at a constant value according to the change of the steer angle θ, and, when the change direction of the steer angle θ is reversed, changes to a reversed sign hysteresis torque value and stays at such value thereafter.

Figure 5:
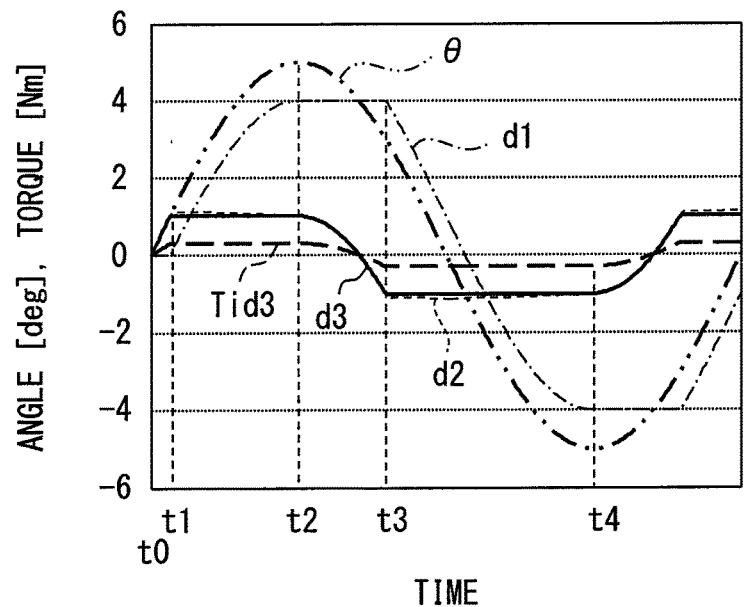
FIG. 5 is a graph of a time chart of outputs from various parts of a hysteresis correction part.

FIG. 5 is a time chart of the waveforms regarding the steer angle θ, the values d1, d2, d3, and the hysteresis correction torque Tid3 when the steer angle θ of the steering operation is controlled to have a sine waveform.

The value d3(n) may be represented by the following equation 1.

In the equation 1, a function Guard( ) indicates that a value is restricted to be within a certain range (e.g., within a limit of ±1 degree), and an "n" indicates a value in the current calculation cycle, and an "n−1" indicates a value in the previous calculation cycle.

$$\begin{aligned} d3(n) &= \text{Guard}\,(d2(n)) \\ &= \text{Guard}\,(\theta(n) - d1(n)) \\ &= \text{Guard}\,(\theta(n) - (\theta(n-1) - d3(n-1))) \\ &= \text{Guard}\,(\theta(n) - \theta(n-1) + d3(n-1)) \end{aligned} \qquad \text{(Equation 1)}$$

According to the last line of the equation 1, the value d3(n) is understood as an accumulation of difference of the steer angle θ from the previous calculation cycle, in case that the value d3(n) is within a restriction range. Therefore, within the restriction range, the waveform of the value d3 is the same as the waveform of the steer angle θ(n) (i.e., having the same change). In a time chart of FIG. 5, the waveforms of the value d3 and the steer angle θ(n) are the same for the certain period of times (e.g. in time t0-t1, in time t2-t3, etc.).

When the value in Guard( ) reaches the upper limit or the lower limit, the value stays at the upper limit or the lower limit. In the time chart of FIG. 5, the waveform of the value d3 in time t1-t2 or in time t3-t4 represents such a state.

Figure 6:
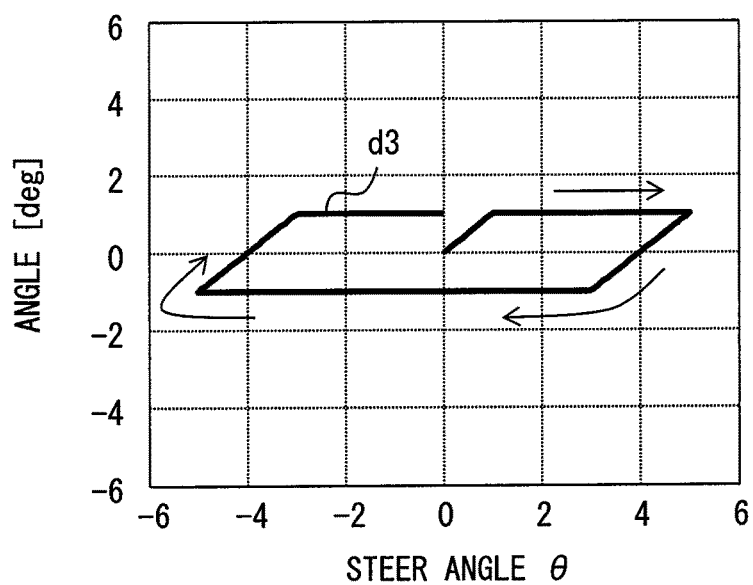
FIG. 6 is a graph of a Lissajou's waveform regarding a change of a value d3 according to a change of the steer angle in FIG. 5.

When the change of the value d3 over the steer angle θ is represented based on the steer angle θ and the value d3 in the FIG. 5, a Lissajou's waveform as shown in FIG. 6 is derived. That is, the value d3 stays either at the upper limit value or the lower limit value, which is a restriction value, and, when the direction is reversed, the value d3 is the same value as the steer angle θ until the value d3 reaches the reverse sign restriction value, and stays there after reaching the restriction value.

When the value d3 is multiplied by the gain Kh, the hysteresis correction torque Tid3 is derived. Therefore, a Lissajou's waveform of the hysteresis correction torque Tid3 shown in FIG. 7 is also the same form as the waveform of FIG. 6.

Returning to FIG. 2, the adder 141 adds the steer angle reference correction torque Tid2, which is outputted from the steer angle based target correction part 150, to the hysteresis correction torque Tid3 which is outputted from the hysteresis correction part 160. An added value Tid2+Tid3 is equivalent to the correction torque.

The value Tid2+Tid3 is added to the pre-correction target steer torque Tid1 by the adder 131. The value after such an addition by the adder 131 is a final target steer torque Tid.

Figure 7A:
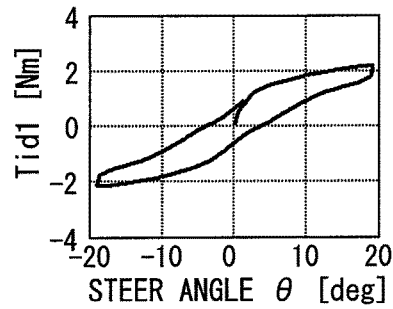
FIG. 7A/B/C/D are graphs of the Lissajou's waveform regarding a change of torques Tid1, Tid2, Tid3, and Tid according to a change of the steer angle.

FIG. 7A/B/C/D respectively show a Lissajou's waveform which illustrates the change of the pre-correction target steer torque Tid1, of the steer angle reference correction torque Tid2, of the hysteresis correction torque Tid3, and of the target steer torque Tid, against the change of the steer angle θ.

As shown in FIG. 7A, when the steer angle θ is increased, the pre-correction target steer torque Tid1 increases with the increase of the steer angle θ.

When the change of the steer angle θ is reversed (i.e., having a decrease trend), the pre-correction target steer torque Tid1 decreases with the decrease of the steer angle θ, with the value of the torque Tid1 in the decrease trend being smaller than the value of the torque Tid1 in the increase trend.

Figure 7B:
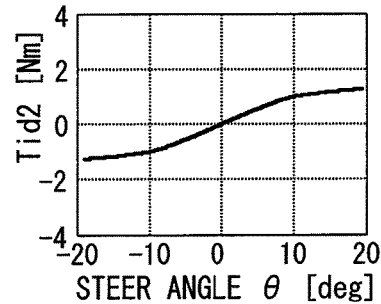
Figure 7C:
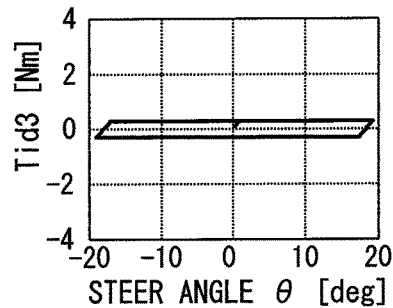
Figure 7D:
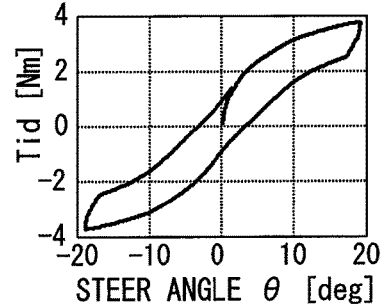

As shown in FIG. 7B, the steer angle reference correction torque Tid2 increases when the steer angle θ is increased. The steer angle reference correction torque Tid2 does not have a hysteresis width. Therefore, only adding the pre-correction target steer torque Tid1 by the steer angle reference correction torque Tid2 leads to a too-small hysteresis width ratio against the absolute value of the torque, which means that the driver may feel that the return torque of the steering wheel is too strong. Therefore, the hysteresis correction torque Tid3, which is in a Lissajou's waveform of FIG. 7C, is added to the steer angle reference correction torque Tid2. Then, by adding the sum of the hysteresis correction torque Tid3 and the steer angle reference correction torque Tid2 to the pre-correction target steer torque Tid1, the final target steer torque Tid shown in FIG. 7D has the same or even greater hysteresis width ratio against the absolute value than the torque Tid1.

The target steer torque Tid calculated in the above-described manner is then inputted to the subtraction part 170. The subtraction part 170 subtracts the steer torque Ts from the target steer torque Tid. That is, in the subtraction part 170, the torque deviation ΔT, which is a deviation of the target steer torque Tid and the steer torque Ts is calculated. The torque deviation ΔT is inputted to the servo controller 180. The servo controller 180 calculates the assist torque instruction value Ta* so that the torque deviation ΔT becomes zero, so that the steer torque Ts is equated to the target steer torque Tid. The subtraction part 170 and the servo controller 180 in combination serve as an instruction value determiner.

The servo controller 180 is provided with a proportionizer 181, an integrator 182, a differentiator 183, and an adder 184.

The proportionizer 181 multiplies the torque deviation ΔT by a gain Kp. The integrator 182 performs an integration calculation for the torque deviation ΔT with an integration constant Ki. The differentiator 183 performs a differentiation calculation of the torque deviation ΔT by a differentiation constant Kd. A character "s" is a Laplacian operator and a character "τ" is a time constant.

The assist torque instruction value Ta* is inputted to the electric current feedback part 190 and to the adder 111 mentioned above.

Based on the assist torque instruction value Ta*, the electric current feedback part 190 applies a drive voltage Vd to the motor 6 so that the assist torque corresponding to the assist torque instruction value Ta* is provided to a part of the steering mechanism, which is a part closer to the steered tire 10 relative to the torque sensor 4.

More specifically, based on the assist torque instruction value Ta*, a target electric current to be supplied to each phase of the motor 6 is set. Then, the electric current value Im of each phase is detected, and the detected electric current is controlled to be equated to the target electric current by the control of the drive voltage Vd, for a generation of the desired assist torque.

Figure 8:
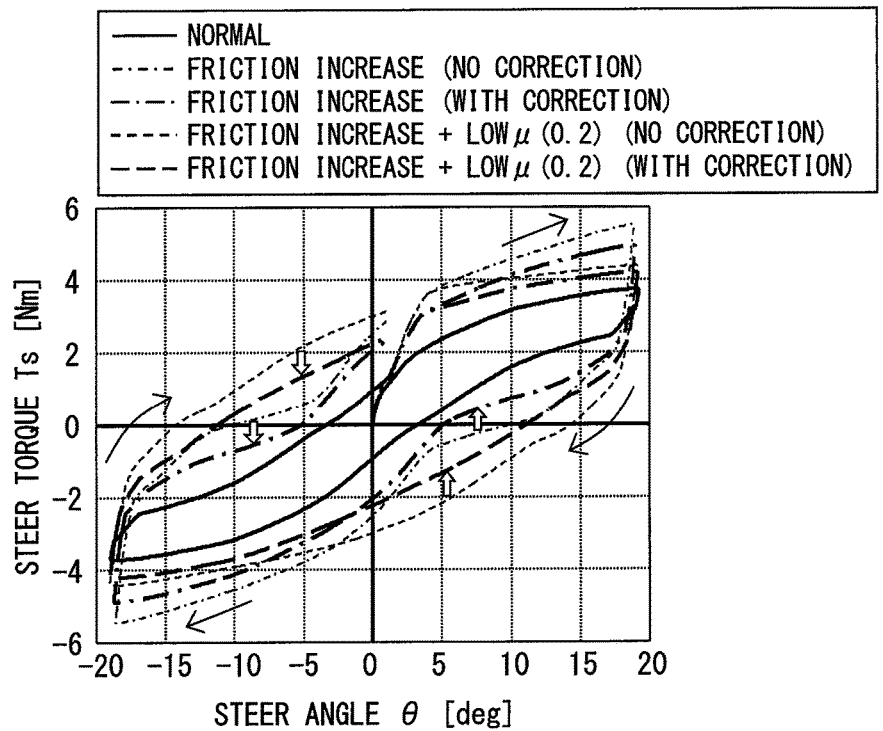
FIG. 8 is a graph of comparison between the Lissajou's waveforms in a control by the torque Tid1 and in a control by the torque Tid in the first embodiment of the present disclosure.

FIG. 8 is a graph of comparison between the Lissajou's waveforms regarding a control by the pre-correction target steer torque Tid1 and regarding a control by the target steer torque Tid.

FIG. 8 shows, similar to FIG. 4 in a situation in which the steer angle θ is changed along time to have a sine waveform, a relationship between the steer angle θ and the steer torque Ts.

In FIG. 8, a solid line, a one-dot short dash line, and a short broken line respectively represent a direct input of the pre-correction target steer torque Tid1 to the subtraction part 170, i.e., without correction. Therefore, the solid line, the one-dot short dash line, and the short broken line in FIG. 8 respectively have the same form as the solid line, the one-dot dash line, and the broken line in FIG. 4.

A one-dot long dash line and a long broken line respectively represent an input of the target steer torque Tid to the subtraction part 170.

Based on the comparison between the one-dot short dash line and the one-dot long dash line, it is understood that the steer torque Ts resisting a returning rotation of the steering wheel 2 in a steering wheel returning situation, in which the steering wheel is steered back to the neutral position toward the steer angle θ of 0 degree, is decreased by performing the correction based on the steer angle θ even in the friction increased time/state.

More practically, the fourth quadrant of the graph in FIG. 8, where the steer angle θ is positive and the steer torque Ts is negative, illustrates a situation in which the steering wheel 2 is rotated back to the neutral position. In this case, the steering wheel 2 is assumed to be rotated from the left toward the neutral position in a rightward rotation. For smoothly returning the steering wheel 2 to the neutral position, the steer torque Ts during such a return time from the left to the neutral position may preferably be a value of 0 or a slightly positive value.

However, in the fourth quadrant, the steer torque Ts is taking a negative value, which indicates that a resisting torque resisting a return rotation of the steering wheel 2 is generated. In other words, the driver has to apply a force to the steering wheel 2 to a rotation direction of the steering wheel 2 (i.e., for a returning of the steering wheel 2 back to the neutral position).

On the other hand, the Lissajou's waveform in the one-dot long dash line has its part in the fourth quadrant decreased in comparison to the one-dot short dash line. Therefore, by providing the target steer torque Tid which is derived from a correction of the pre-correction target steer torque Tid1 based on the steer angle θ, the steering wheel 2 is more smoothly rotated back to the neutral position.

Further, based on the comparison between the long broken line and the short broken line, it is understood that the steer torque Ts resisting the returning rotation of the steering wheel 2 in a steering wheel returning situation is also decreased by performing the correction based on the steer angle θ even in the friction increased time and in the traveling on the low μ road.

As mentioned above, according to the first embodiment, the torque deviation ΔT, which is a deviation of the target steer torque Tid and the steer torque Ts, is used to determine the assist torque instruction value Ta* with the subtraction part 170 and the servo controller 180. Then, the target steer torque Tid is determined by the "based on the steer angle θ" correction of the pre-correction target steer torque Tid1, which is determined based on the estimated load Tx.

The correction in the first embodiment is, more practically, a correction in which a correction torque that is derived by an addition of the hysteresis correction torque Tid3 to the steer angle reference correction torque Tid2, which increases with the increase of the steer angle θ, is added to the pre-correction target steer torque Tid1 that is determined based on the estimated load Tx.

Since the influence of the friction generated in the steering system components on the steer torque Ts changes according to the steer angle θ, such a change of the influence of the friction generated in the steering system components on the steer torque Ts is reduced (i.e., is substantially diminished) by the above-mentioned correction. Therefore, a robust steering feel is established regardless of the change of the influence from the friction of the steering system components, or from the environment such as a change of a road surface load when entering into a low μ road.

Second Embodiment

The second embodiment of the present disclosure is described in the following.

In the description of the second embodiment, like numbers represent like parts of the first embodiment, unless otherwise mentioned. When only a part of a configuration is described, other part is borrowed from the configuration in the preceding embodiment(s).

Figure 9:
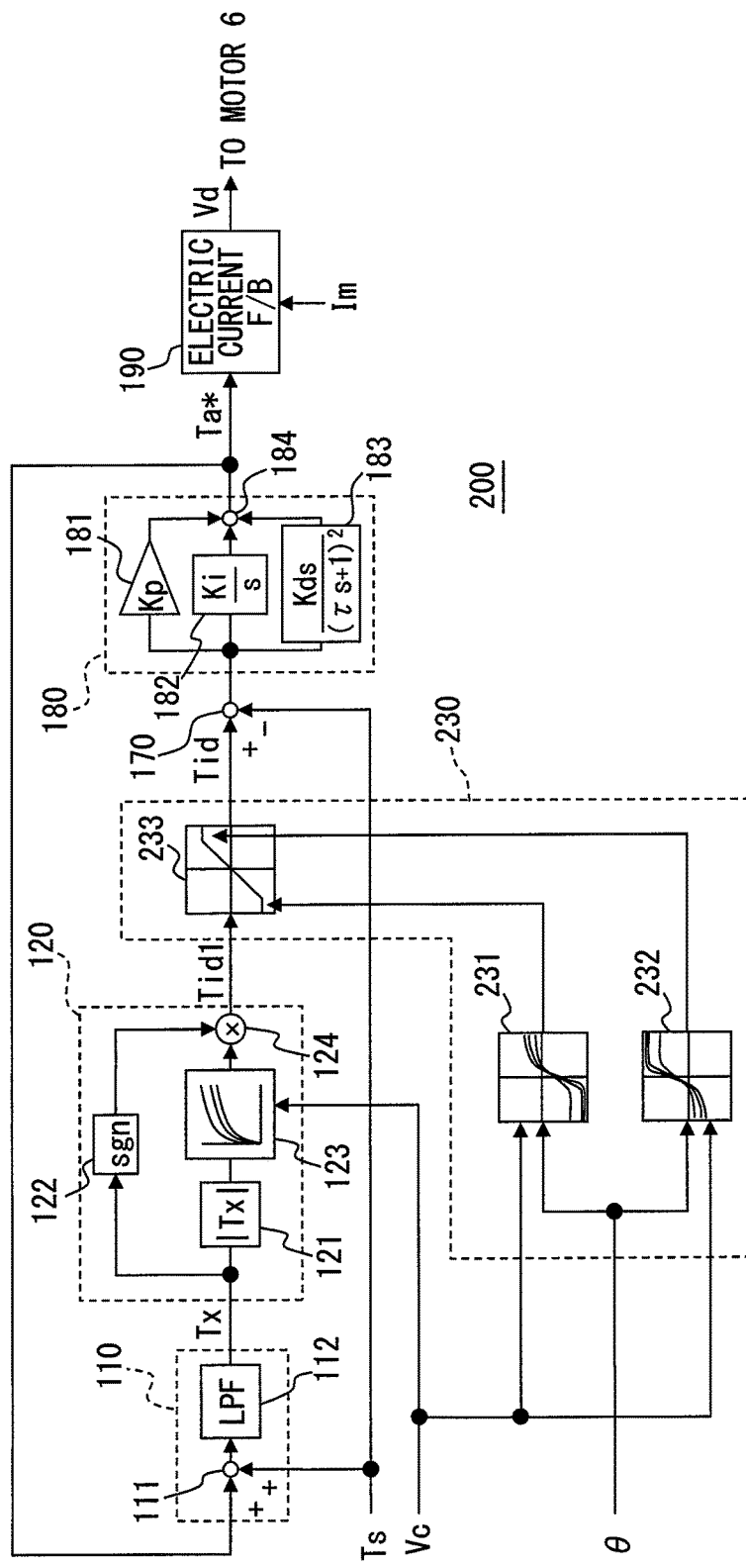
FIG. 9 is a block diagram of components in an EPSECU in a second embodiment of the present disclosure.

The electric power steering system of the second embodiment is provided with EPSECU 200 shown in FIG. 9, instead of having EPSECU 100 shown in FIG. 2. The other part of the system is the same as the system 1 in the first embodiment.

EPSECU 200 is provided with the same components (i.e., the load estimation part 110, the pre-correction target determination part 120, the subtraction part 170, the servo controller 180, and the electric current feedback part 190) that are described in the first embodiment. Further, the target correction part 130 is replaced with a target correction part 230.

Figure 10:
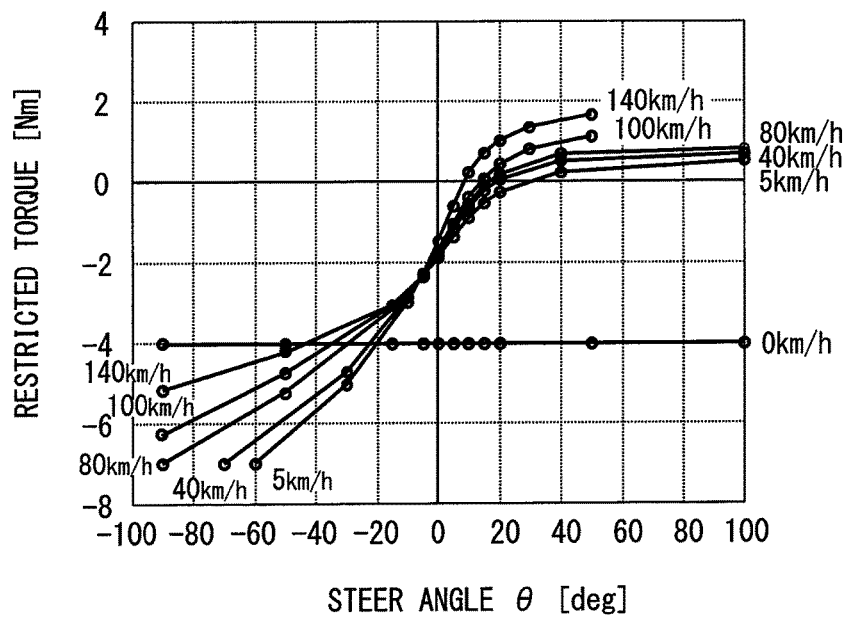
FIG. 10 is a graph of a lower limit map used in a lower limit determination part 231 in FIG. 9.

The target correction part 230 is provided with a lower limit determination part 231, an upper limit determination part 232, and a restrictor 233. The lower limit determination part 231 is provided with a lower limit map. FIG. 10 shows an example of the lower limit map.

As shown in FIG. 10, at 0 km/h, a graph of the lower limit map takes a constant value, (i.e., is not changing according to the steer angle θ).

Except for 0 km/h, a restricted torque is increased as the steer angle θ is increased. The restricted torque increases to a high value, as the vehicle speed Vc increases, as long as the steer angle θ is in a positive range. On the contrary, the restricted torque decreases to a low value, as the vehicle speed Vc increases, when the steer angle θ is in the negative range.

The lower limit determination part 231 performs a linear interpolation of the lower limit map illustrated in FIG. 10 based on the steer angle θ and the vehicle speed Vc, and determines the lower limit torque that serves as a lower limit of the target steer torque Tid.

The upper limit determination part 232 is provided with an upper limit map. Although the upper limit map is not illustrated, the upper limit map and the lower limit map are in a point-symmetric relationship.

The upper limit determination part 232 performs a linear interpolation of the upper limit map based on the steer angle θ and the vehicle speed Vc, and determines the upper limit torque that serves as an upper limit of the target steer torque Tid.

The upper limit determination part 232 and the above-mentioned lower limit determination part 231 are equivalent to an upper limit determiner and lower limit determiner.

Since the lower limit map and the upper limit map are in the point-symmetric relationship, the sign of the steer angle θ may be reversed for the application of the angle θ to the lower limit map, and once a value of the torque is calculated from the lower limit map based on the steer angle θ and the vehicle speed Vc, the sign of the calculated value may be reversed to determine the upper limit torque.

The restrictor 233 receives an input of the pre-correction target steer torque Tid1. The restrictor 233 outputs an as-is value of the inputted pre-correction target steer torque Tid1 as the target steer torque Tid, if the pre-correction target steer torque Tid1 inputted to the restrictor 233 has a value between the lower limit torque and the upper limit torque.

If the pre-correction target steer torque Tid1 inputted to the restrictor 233 has a value that is equal to or lower than the lower limit torque, the lower limit torque is outputted as the target steer torque Tid.

If the pre-correction target steer torque Tid1 inputted to the restrictor 233 has a value that is equal to or greater than the upper limit torque, the upper limit torque is outputted as the target steer torque Tid.

Figure 11:
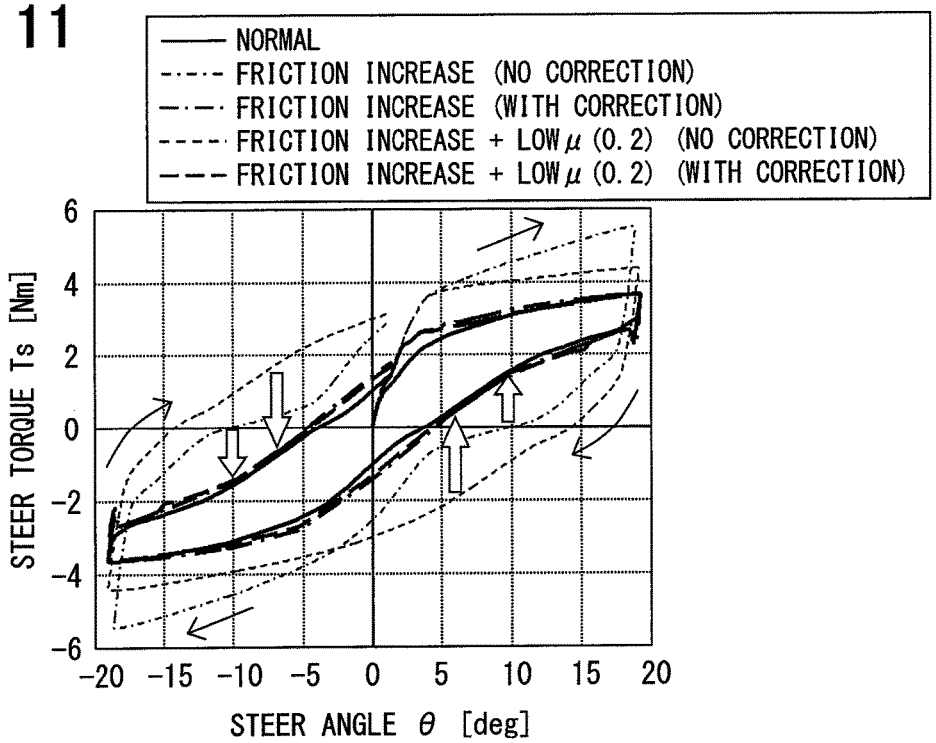
FIG. 11 is a graph of the Lissajou's waveforms in a control by the torque Tid1 and in a control by the torque Tid.

FIG. 11 is a graph of comparison between the Lissajou's waveforms representing the relationship between the steer angle θ and the steer torque Ts, in one control by the pre-correction target steer torque Tid1 and in another control by the target steer torque Tid in the second embodiment.

FIG. 11 is similar to FIGS. 4 and 8, in terms of the steer angle θ that is controlled to have a sine waveform, for showing the relationship between the steer angle θ and the steer torque Ts. Further, similar to FIG. 8, the solid line, the one-dot short dash line, and the short broken line respectively represent a direct input of the pre-correction target steer torque Tid1 to the subtraction part 170.

The one-dot long dash line and the long broken line respectively represent an input of the target steer torque Tid to the subtraction part 170. While the waveform of the one-dot long dash line and the long broken line is close to the sold line waveform, the waveform of the one-dot short dash line and the short broke line is largely diverted from the waveform of the sold line that is a waveform of the normal time. Therefore, when the correction that restricts the upper and lower limits of the target steer torque Tid based on the steer angle θ is performed, even if the friction of the steering system components increases and even further if the vehicle comes across a low μ road, the steer angle θ—the steer torque Ts relationship will not be substantially changed.

Therefore, by providing the electric power steering system with a configuration described in the second embodiment, the steering feel of the electric power steering stays unchanged (i.e., is perceived as robust), even when the influence of the friction on the steering torque Ts and the reaction force from the road surface are changed (i.e., even when the influence of the steering system components are increased), relative to the influence of the other factors.

Third Embodiment

Figure 12:
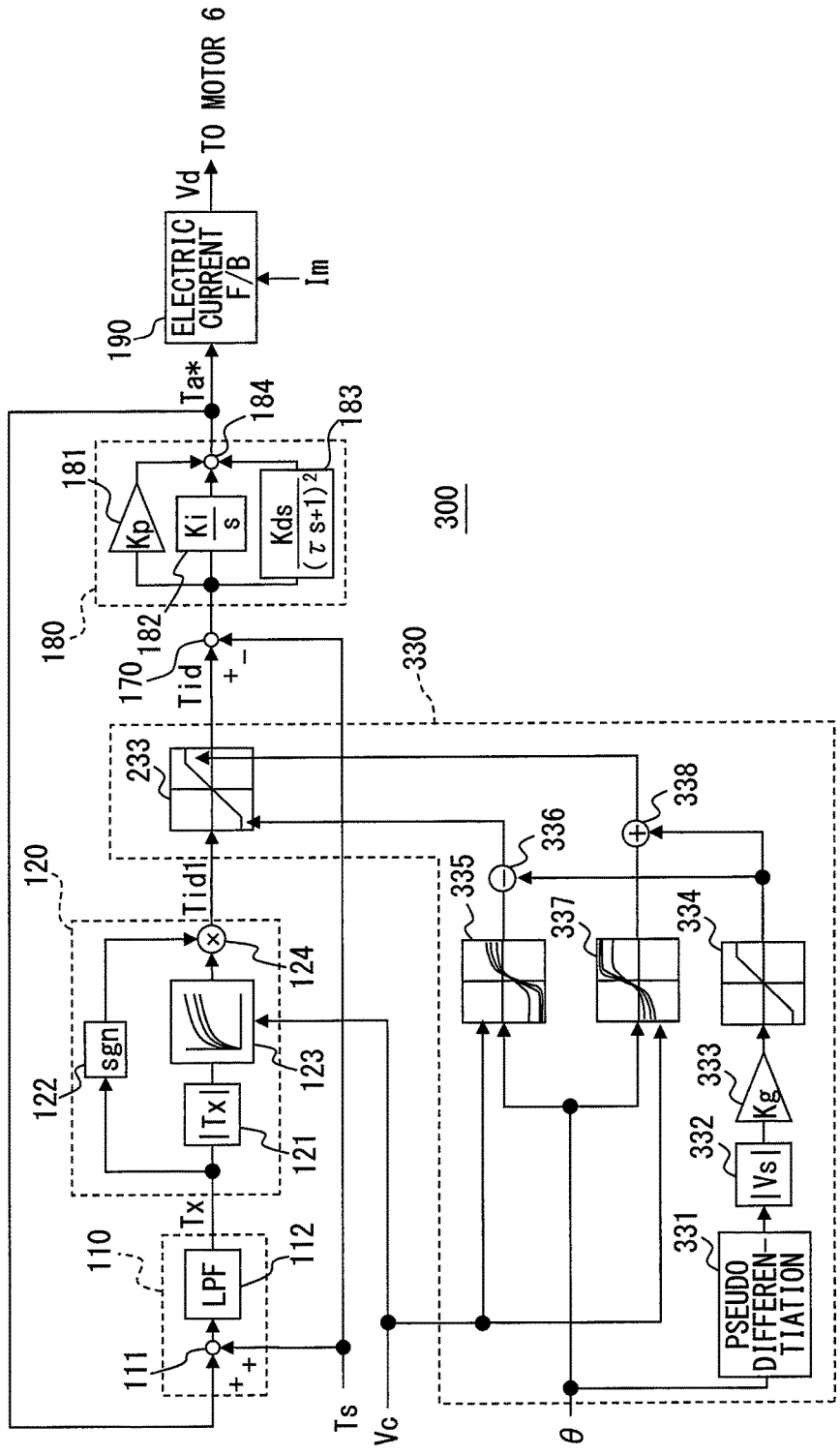
FIG. 12 is a block diagram of components in an EPSECU in a third embodiment of the present disclosure.

The third embodiment of the present disclosure is described in the following. The electric power steering system of the third embodiment has, in place of EPSECU 200 shown in FIG. 9, EPSECU 300 shown in FIG. 12. Other configuration are the same as the electric power steering system of the second embodiment.

EPSECU 300 has a target correction part 330 that is differently configured from the target correction part 230 of the second embodiment. Other configurations are the same as EPSECU 200 of the second embodiment.

The target correction part 330 also is provided with the restrictor 233 that is found in the target correction part 230 of the second embodiment. In addition to the above, the target correction part 330 has an adder 338 that is equivalent to a pseudo differentiator 331, an absolute value generator 332, an amplifier 333, the correction amount determination part 334, a pre-correction lower limit determination part 335, a subtracter 336, a pre-correction upper limit determination part 337, and an adder 338.

The pseudo differentiator 331 performs a pseudo differentiation of the steer angle θ with the filter. The value after the pseudo differentiation is a steering speed Vs. The absolute value generation part 332 generates an absolute value of the steering speed Vs that is generated by the pseudo differentiator 331, and outputs the absolute value to the amplifier 333. The amplifier 333 amplifies the absolute value of the steering speed Vs, which is outputted from the absolute value generator 332, by a gain Kg set in advance. The correction amount determination part 334 determines a correction amount with which a pre-correction lower limit torque and a pre-correction upper limit torque are corrected. The correction amount determination part 334 has a correction amount map. The correction amount map is a map which receives an output value from the amplifier 333 and output a correction amount. The correction amount map has a lower limit and an upper limit of the correction amount that are predetermined, and the correction amount map outputs the same value as the input value when the input value of the correction amount map is within a range of the lower limit and the upper limit. The correction amount determination part 334 determines the correction amount based on the correction amount map and a value which is outputted from the amplifier 333.

The pre-correction lower limit determination part 335 is the same as the lower limit determination part 231 of the second embodiment. However, in the third embodiment, a value determined by the pre-correction lower limit determination part 335 is used as a pre-correction lower limit torque.

The subtracter 336 subtracts the correction amount which is determined by the correction amount determination part 334 from the pre-correction lower limit torque which is determined by the pre-correction lower limit determination part 335. In the third embodiment, a value after the subtraction by the subtracter 336 is used as a lower limit torque.

The pre-correction upper limit determination part 337 is the same as the upper limit determination part 232 of the second embodiment. However, in the third embodiment, a value which is determined by the pre-correction upper limit determination part 337 is used as a pre-correction upper limit torque.

The adder 338 adds the correction amount which is determined by the correction amount determination part 334 to the pre-correction upper limit torque which is determined by the pre-correction upper limit determination part 337. In the third embodiment, a value after the addition by the adder 338 is an upper limit torque.

According to the third embodiment, the pre-correction lower limit determination part 335, the subtracter 336, the pre-correction upper limit determination part 337, and the adder 338 are equivalent to an upper and lower limit determiner.

The restrictor 233 is the same part as the second embodiment. However, in the third embodiment, a range, i.e., a difference, between the lower limit and the upper limit is widened than second embodiment by a two-fold amount of the correction amount. That means, the range between the lower limit and the upper limit is widened as the steering speed Vs increases to a high value, since the correction amount is increased as the steering speed Vs increases to a high value.

Figure 13:
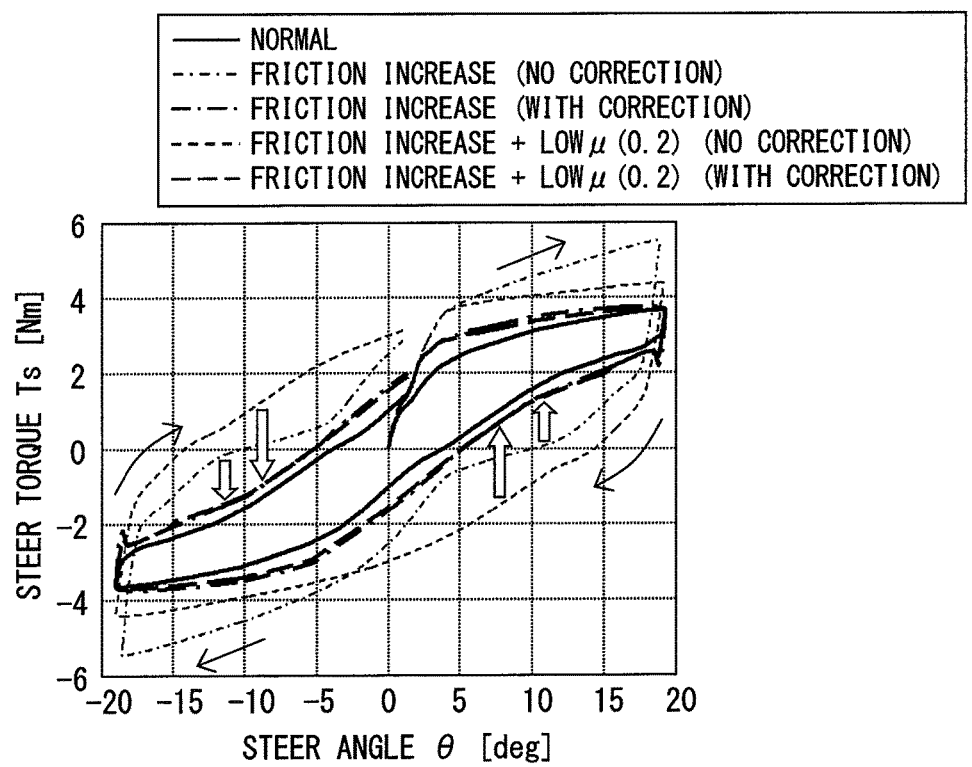
FIG. 13 is a graph of comparison between the Lissajou's waveforms in a control by the torque Tid1 and in a control by the torque Tid in the third embodiment of the present disclosure.

FIG. 13 is a graph of comparison between the Lissajou's waveforms representing the relationship between the steer angle θ and the steer torque Ts in one control by the pre-correction target steer torque Tid1 and in another control by the target steer torque Tid in the third embodiment.

FIG. 11 is similar to FIGS. 4, 8 and 11, in terms of the steer angle θ that is controlled to have a sine waveform, for showing the relationship between the steer angle θ and the steer torque Ts. Further, similar to FIGS. 8 and 11, the solid line, the one-dot short dash line, and the short broken line respectively represent a direct input of the pre-correction target steer torque Tid1 to the subtraction part 170.

The one-dot long dash line and the long broken line respectively represent an input of the target steer torque Tid that is corrected by the target correction part 330 to the subtraction part 170.

Although the waveforms of the one-dot long dash line and the long broken line in FIG. 11 is almost the same waveform as the solid line, the waveform of the one-dot long dash line and the long broken line in the third embodiment has a wider hysteresis width than the waveform in the solid line. Further, the hysteresis width is widened as the steering speed Vs increases to a high value.

When the steering speed Vs is high, the hysteresis width in the steer angle θ—the steer torque Ts relationship is widened. Therefore, when the driver intentionally operates the steering wheel from one extreme end to the other (e.g., when the driver performs a cutback or a counter-steer operation), the hysteresis width is further widened. Thereby, the transition from a restoration force that returns the steering wheel toward the neutral position to a resistance force that resists to the operation of the steering wheel is made to be less steep (i.e., becomes smoother).

When the driver intentionally performs a cutback and in case that the steering speed Vs is high, a loop shape of the Lissajou's waveform in the normal time tells that the sign of the steer torque Ts will quickly change from positive (+) to negative (−) in a short time. In other words, the driver of the vehicle receives a force that is quickly changing from the steering wheel 2.

On the other hand, in the third embodiment, when the steering speed Vs is high, the hysteresis width in the steer angle θ, the steer torque Ts relationship is widened, and the change of the steer torque Ts becomes less steep. Therefore, even when the steering speed Vs is high, the steep change of a force that is applied from the steering wheel 2 to the driver is prevented. In other words, the steering feel is improved.

Further, in the third embodiment, while the amount of restriction by the restrictor 233 is changed according to the steering speed Vs, the target steer torque Tid is restricted according to the steer angle θ, just like the second embodiment. Therefore, the steering feel in the third embodiment also stays robust against the relative change of the influence from the friction of the steering system components.

Although the present disclosure has been described in connection with preferred embodiment thereof with reference to the accompanying drawings, it is to be noted that various changes and modifications become apparent to those skilled in the art.

Modification 1

For example, in the above-mentioned embodiments, the rotation angle of the steering shaft 3 is used as the steer angle θ (i.e., as the rotation angle of the component) rotated by an operation of the steering wheel 2. However, the component used for the detection of the steer angle θ is not limited to the steering shaft 3.

For example, the rotation angle of the intermediate shaft 5, of the motor 6, or of the steered tire 10 may also be used as the steer angle θ.

Modification 2

According to the first embodiment, the steer angle reference correction torque Tid2 and the hysteresis correction torque Tid3 are added to the pre-correction target steer torque Tid1, for determining the target steer torque Tid.

However, without adding the hysteresis correction torque Tid3, the target steer torque Tid may be determined by adding the steer angle reference correction torque Tid2 to the pre-correction target steer torque Tid1.

Modification 3

The first embodiment or the modification 2 may be combined with the second embodiment or with the third embodiment.

That is, a value which is derived from an addition of the correction torque (i.e., (i) the steer angle reference correction torque Tid2+the hysteresis correction torque Tid3 OR (ii) the steer angle reference correction torque Tid) to the pre-correction target steer torque Tid1 may be corrected by the target correction part 130 or 230.

Modification 4

The steering speed Vs is calculated in the third embodiment by performing a pseudo differentiation of the steer angle θ. However, the calculation of the steering speed Vs is not necessarily limited to such method.

For example, the steering speed Vs may be determined by detecting a rotation speed of the motor 6.

Modification 5

In the first embodiment mentioned above, the hysteresis correction torque Tid3 is calculated so that the torque Tid3 saturates to a constant value at some point of change of the steer angle θ. However, the torque Tid3 may be defined in a different manner.

For example, by changing the gain Kh according to the steer angle θ, the hysteresis width may be widened according to the steer angle θ.

When the hysteresis width is changed according to the steer angle θ, as the absolute value of the steering angle θ increases, the hysteresis width occupies a greater portion in the target steer torque Tid (i.e., the ratio of the width against the absolute value of the torque Tid). Therefore, the adjustablility of the steer torque Ts is improved, for controlling the steering feel in a more preferable manner for the driver.

Modification 6

In the above-mentioned embodiments, the electric power steering system is described as a shaft-assist type, in which the rotation of the intermediate shaft 5 is assisted by the motor 6. However, the present disclosure may be applicable to the electric power steering of the other assist type.

For example, the present disclosure may be applicable to an electric power steering of rack-assist type, in which the translational movement of the rack in the steering gear box 7 is assisted by the motor 6, or to the other assist type electric power steering.

Such changes, modifications, and summarized schemes are to be understood as being within the scope of the present disclosure as defined by appended claims.

What is claimed is:

1. An electric power steering controller disposed in an electric power steering system having a torque detector detecting a steer torque that is applied to a torsion bar based on a twist angle of the torsion bar that serves as a part of a torque transmission path for transmitting a rotation of a steering wheel in a vehicle to a tire to be steered; and a motor generating an assist torque that assists a steering operation of the steering wheel when the steering wheel is operated for steering the tire, the electric power steering controller configured to comprise:
    a load estimator estimating a road surface load;
    a pre-correction target determiner determining a pre-correction target steer torque based on the estimated road surface load;
    a steer angle detector detecting a rotation angle of a member that is rotated according to a rotation of the steering wheel;
    a target corrector correcting the pre-correction target steer torque based on the rotation angle detected by the steer angle detector and determining a target steer torque;
    an instruction value determiner determining and outputting an assist torque instruction value based on a deviation between the target steer torque and the detected steer torque; and
    an electric current feedback driver that receives the assist torque instruction value and applies a drive voltage based on the assist torque instruction value to the motor to generate the assist torque.

2. The electric power steering controller of claim 1, wherein
    the target corrector determines a correction torque based on the steer angle, and determines the target steer torque by adding the correction torque to the pre-correction target steer torque.

3. The electric power steering controller of claim 2, wherein
    the target corrector includes:
    a steer angle based target corrector determining, based on the steer angle, a steer angle reference correction torque as the steer angle increases;

a hysteresis corrector determining a hysteresis correction torque, which is a torque provided according to a change of the steer angle, the hysteresis correction torque is switched to have a negative value when a direction of the change of the steer angle is reversed; and an adder adding the steer angle reference correction torque that is determined by the steer angle based target corrector and the hysteresis correction torque that is determined by the hysteresis corrector to have the correction torque.

4. The electric power steering controller of claim 1, wherein the target corrector includes:

an upper limit determiner and a lower limit determiner respectively determining, based on the steer angle, an upper limit torque and a lower limit torque which respectively define an upper limit and a lower limit of the target steer torque; and a restrictor setting the target steer torque by restricting the pre-correction target steer torque with the upper limit torque and the lower limit torque that are determined by the upper limit determiner and the lower limit determiner.

5. The electric power steering controller of claim 4, wherein the upper limit determiner and the lower limit determiner widen a difference between the upper limit torque and the lower limit torque as a steering speed increases.

6. The electric power steering controller of claim 1, wherein the load estimator estimates the road surface load based on the steer torque detected by the torque detector and the assist torque instruction value that instructs an application of the assist torque.

7. An electric power steering system, comprising:

a torque detector detecting a steer torque that is applied to a torsion bar based on a twist angle of the torsion bar that serves as a part of a torque transmission path for transmitting a rotation of a steering wheel in a vehicle to a tire to be steered; and an electric power steering controller, the electric power steering controller configured to include:

a load estimator estimating a road surface load;

a pre-correction target determiner determining a pre-correction target steer torque based on the estimated road surface load;

a steer angle detector detecting a rotation angle of a member that is rotated according to the rotation of the steering wheel;

a target corrector correcting the pre-correction target steer torque based on the rotation angle detected by the steer angle detector and determining a target steer torque;

an instruction value determiner determining and outputting an assist torque instruction value based on a deviation between the target steer torque and the detected steer torque; and an electric current feedback driver that receives the assist torque instruction value and applies a drive voltage based on the assist torque instruction value to the motor to generate the assist torque; and a motor generating an assist torque that assists a steering operation of the steering wheel, when the steering wheel is operated for steering the tire.

* * * * *